United States Patent
Thomassin et al.

(10) Patent No.: US 11,926,426 B2
(45) Date of Patent: Mar. 12, 2024

(54) ELECTRIC DISTRIBUTED PROPULSION USING EXHAUST RECOVERY POWER

(71) Applicant: Pratt & Whitney Canada Corp., Longueuil (CA)

(72) Inventors: Jean Thomassin, Ste Julie (CA); Todd A. Spierling, Rockford, IL (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/207,348

(22) Filed: Mar. 19, 2021

(65) Prior Publication Data

US 2022/0297843 A1 Sep. 22, 2022

(51) Int. Cl.
*B64D 27/24* (2006.01)
*B64D 27/04* (2006.01)
*F02B 37/00* (2006.01)

(52) U.S. Cl.
CPC .............. *B64D 27/24* (2013.01); *B64D 27/04* (2013.01); *F02B 37/00* (2013.01); *F05D 2220/40* (2013.01)

(58) Field of Classification Search
CPC .. B64D 27/04; B64D 2027/026; B64D 27/24; F02B 37/00; F02B 37/005; F02B 41/10; F05D 2220/40
See application file for complete search history.

(56) References Cited

U.S. PATENT DOCUMENTS

| | | | |
|---|---|---|---|
| 9,789,768 B1 * | 10/2017 | Meier | B64C 39/024 |
| 10,017,266 B2 * | 7/2018 | Phan | F01D 15/10 |
| 10,119,460 B2 * | 11/2018 | Primus | F02B 63/04 |
| 10,435,169 B2 * | 10/2019 | Steinwandel | B64C 29/0025 |
| 10,590,842 B2 * | 3/2020 | Ullyott | F02B 53/02 |
| 11,124,311 B2 * | 9/2021 | Thomassin | F02C 7/275 |
| 2013/0213048 A1 | 8/2013 | Stucki | |
| 2015/0285165 A1 * | 10/2015 | Steinwandel | B64C 39/024 244/55 |
| 2016/0167799 A1 * | 6/2016 | Smaoui | B60K 6/442 701/16 |
| 2016/0332741 A1 * | 11/2016 | Moxon | B64C 21/00 |
| 2017/0029131 A1 * | 2/2017 | Steinwandel | B64D 27/24 |
| 2017/0197700 A1 * | 7/2017 | Wainfan | B64D 27/24 |
| 2017/0267341 A1 * | 9/2017 | Thomassin | B64D 33/10 |
| 2020/0173354 A1 * | 6/2020 | Punjani | F01N 13/008 |
| 2021/0309351 A1 * | 10/2021 | Giannini | B64D 27/24 |

OTHER PUBLICATIONS

Extended European Search Report for European Patent Application No. EP22162823.3, dated Jul. 21, 2021.

* cited by examiner

*Primary Examiner* — Jesse S Bogue
(74) *Attorney, Agent, or Firm* — Norton Rose Fulbright Canada LLP

(57) ABSTRACT

An aircraft power system comprises a turbocharger, the turbocharger including a compressor for supplying combustion air to an internal combustion engine, a turbine operatively connected to an internal combustion engine to receive an exhaust flow from the internal combustion engine and convert energy of the exhaust flow into rotational power and, a turbo shaft operatively connecting the turbine to the compressor to transfer at least some of the rotational power to the compressor. A generator is operatively connected to the turbo shaft to receive at least some of the rotational power from the turbo shaft for generating electrical power. At least one electrically powered air-mover is electrically connected to the generator to receive at least some of the electrical power to produce thrust.

19 Claims, 5 Drawing Sheets

ELECTRIC DISTRIBUTED PROPULSION USING EXHAUST RECOVERY POWER

BACKGROUND

1. Field

The present disclosure is directed to aircraft power architecture, and more particularly to hybrid-electric aircraft power architecture.

2. Description of Related Art

Turbo-charged aircraft engines can provide extra horsepower versus naturally aspirated internal combustion engine. However, for a typical aircraft turbocharger there is a net excess of power from the turbine at cruising speed above and beyond what the compressor needs. One traditional use for this net excess power is to add power from the shaft of the turbocharger to the main shaft of the internal combustion engine, as in a turbo-compounded engine. This configuration can be advantageous for larger displacement engines. For smaller displacement engines, e.g. 50 horse power (37.3 kW) or less, the mechanical complexity involved in turbo-compounding may be less suitable.

The conventional techniques have been considered satisfactory for their intended purposes. However, there is an ever present need for improved systems and methods for improved fuel efficiency and reduced thermal footprint.

SUMMARY

An aircraft power system comprises a turbocharger, the turbocharger including a compressor for supplying combustion air to an internal combustion engine, a turbine operatively connected to an internal combustion engine to receive an exhaust flow from the internal combustion engine and convert energy of the exhaust flow into rotational power and, a turbo shaft operatively connecting the turbine to the compressor to transfer at least some of the rotational power to the compressor. A generator is operatively connected to the turbo shaft to receive at least some of the rotational power from the turbo shaft for generating electrical power. At least one electrically powered air-mover is electrically connected to the generator to receive at least some of the electrical power to produce thrust.

The at least one electrically powered air-mover is electrically connected to the generator via a direct electrical connection that excludes power converters (e.g. without an AC/DC/AC power converter). The at least one electric powered air-mover can include a thrust-producing rotor and at least one of variable inlet guide vanes, a variable air nozzle, and/or variable pitch blades operable to adjust airflow into and/or out of the thrust-producing rotor.

Additionally or alternatively, the at least one electrically powered air-mover can include a plurality of electrically powered air-movers electrically connected to the generator through a switching network configured to selectively power various air-movers of the plurality of electrically powered air-movers. The switching network can be configured to selectively power various air-movers in the plurality of electric powered air-movers.

The system can further include the internal combustion engine operatively connected to the compressor to receive the combustion air from the compressor. The internal combustion engine can also be operatively connected to a main air mover configured to provide thrust to an aircraft in cooperation with the at least one electrically powered air-mover. The system can also include the aircraft, including an airframe, such that the main air mover and the at least one electrically powered air-mover can be mounted to the airframe.

An aircraft power system comprises an internal combustion engine, a turbocharger operatively connected to the turbocharger. The turbocharger includes a compressor for supplying combustion air to the internal combustion engine, a turbine operatively connected to an internal combustion engine to receive an exhaust flow from the internal combustion engine and convert energy of the exhaust flow into rotational and, a turbo shaft operatively connecting the turbine to the compressor to transfer at least some of the rotational power to the compressor. A generator is operatively connected to the turbo shaft to receive at least some of the rotational power from the turbo shaft for generating electrical power. At least one electrically powered air-mover having a thrust producing rotor is electrically connected to the generator to receive at least some of the electrical power to produce thrust.

A controller can be operatively connected to the electrical generator and to the at least one electrically powered air mover. The controller can be configured to control the electrical generator to directly and selectively power the at least one electrically powered air mover and to control one or more thrust control features of the at least one electrically powered air movers.

The one or more thrust control features of the electrically powered air-mover includes at least one of variable pitch blades, variable inlet guide vanes disposed upstream of a thrust-producing rotor, a variable air nozzle downstream of a thrust-producing rotor, and/or switching network operatively connected to the controller.

A method can include supplying combustion air to an internal combustion engine with a turbocharger, extracting electrical power from the turbocharger, and using the extracted electrical power to drive at least one electrically powered air-mover to generate thrust. Using the extracted electrical power can include supplying the extracted electrical power directly to the at least one electric powered air-mover without converting the power.

The method can include controlling one or both of loading of the turbocharger and thrust from the at least one electrically powered air-mover by adjusting airflow into and/or out of the at least one electric electrically powered air mover. The method can additionally, or alternatively include adjusting flow out of the air mover for control of loading of the turbocharger and/or thrust from the at least one electric powered air-mover. Additionally, or alternatively, the at least one electrically powered air-mover can be a plurality of electrically powered air-movers such that the method can further include selectively powering various air-movers of the plurality of electrically powered air-movers to control one or both of loading of the turbocharger and an overall thrust generated by the plurality of electrically powered air-movers.

The method can include providing thrust to an aircraft from a main air mover powered by the internal combustion engine in cooperation with providing thrust to the aircraft from the at least one electrically powered air-mover. The method can include reducing an infrared signature of the aircraft by drawing power out of the turbocharger to the at least one electric powered air-mover.

These and other features of the systems and methods of the subject disclosure will become more readily apparent to those skilled in the art from the following detailed description taken in conjunction with the drawings. This disclosure provides improvements in the turbo-charged aircraft engine space.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
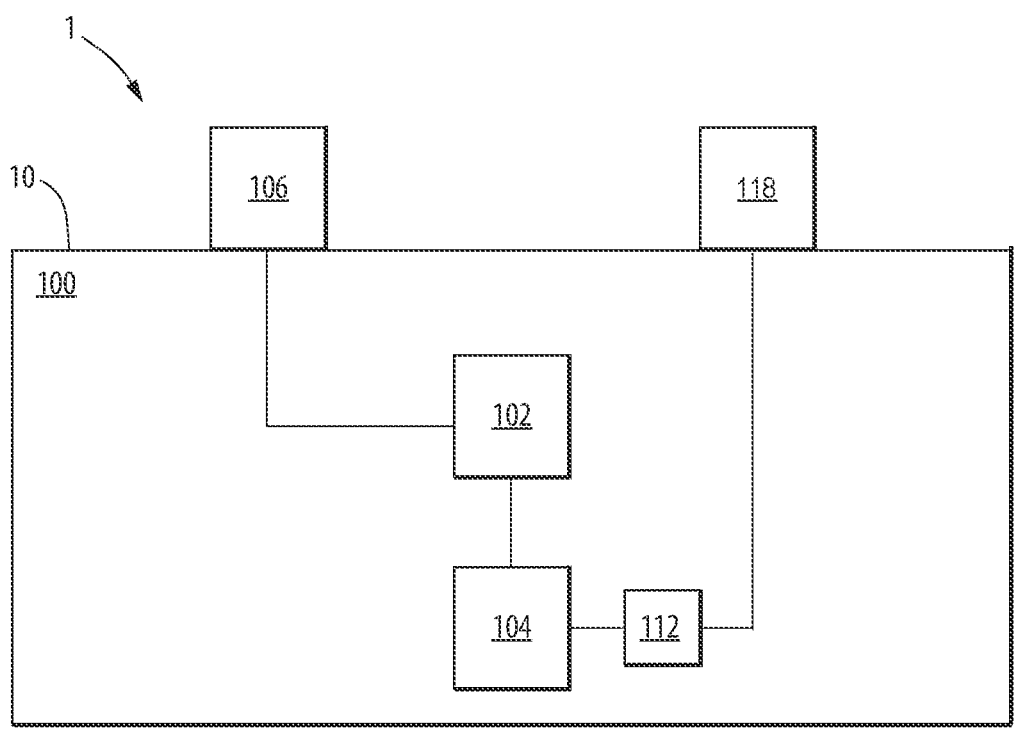
FIG. 1 is a schematic diagram of an embodiment of an aircraft constructed in accordance with the present disclosure, showing an aircraft power system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to improve fuel economy and engine cooling.

Shown in FIG. 1, an aircraft 1 (e.g. a manned or unmanned aircraft) having an airframe 10, can include an aircraft power system 100. The system 100 can include an internal combustion engine 102 and a turbocharger 104 can be operatively connected to the internal combustion engine 102. A main air mover 106 can be mounted to the airframe 10 and operatively connected to the internal combustion engine 102 to provide thrust to the aircraft 1.

Figure 2:
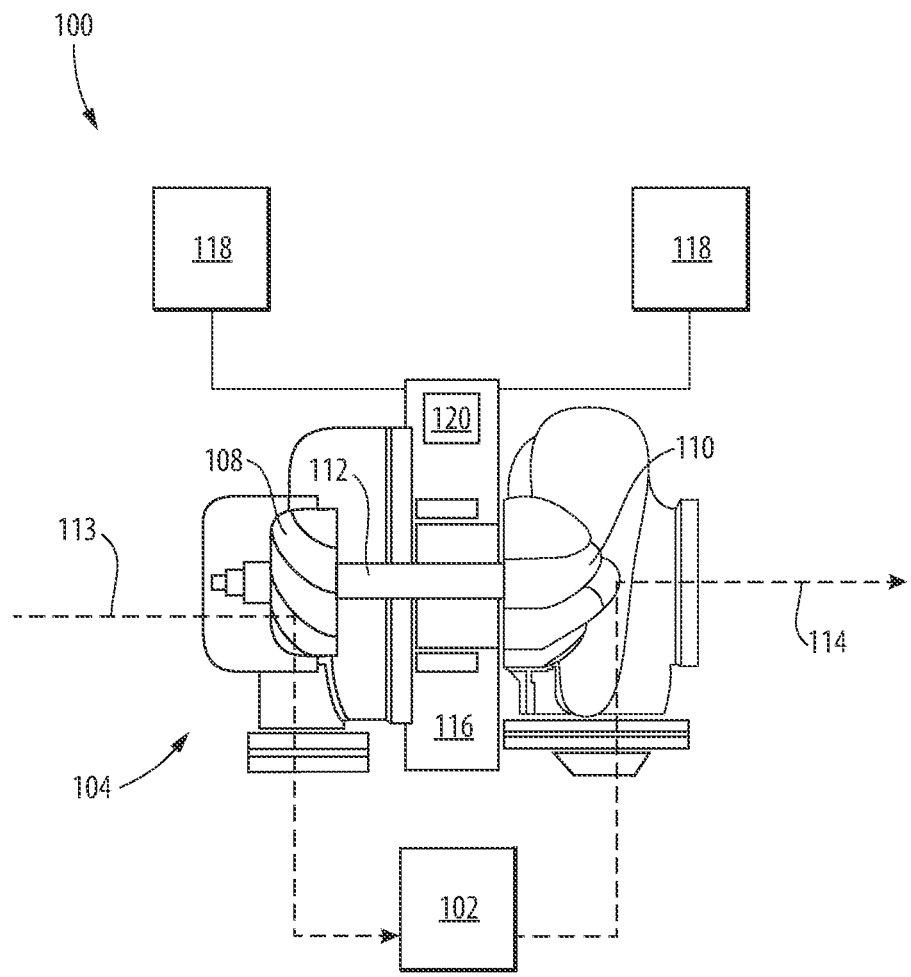
FIG. 2 is a schematic diagram of the aircraft power system FIG. 1 showing a configuration of components in the aircraft power system.

Turning to FIG. 2, the turbocharger 104 can include a compressor 108 fluidly connected to an air inlet of an internal combustion engine 102 for supplying compressed air to a combustion section of the internal combustion engine 102. A turbine 110 can be operatively connected to the internal combustion engine 102 and the compressor 108 through a turbo shaft 112. The turbine 110 receives an exhaust flow 114 from the internal combustion engine 102 and converts the energy of the exhaust flow 114 into rotational power. An generator 116 can be operatively connected to the turbo shaft 112 for generating electrical power from rotation of the turbo shaft 112, utilizing a portion of energy that is available in excess of the energy required for powering the compressor 108, in at least some operating conditions of the aircraft power system 100. At least one electrically powered air-mover 118 can be electrically connected to the generator 116 to be powered by electrical power produced by the generator 116 to produce thrust for the aircraft 1. As shown in FIG. 1, the at least one electrically powered air mover 118 can also be mounted to the airframe 10 to provide thrust in cooperation with the main air mover 106. The at least one electrically powered air-mover 118 can be directly electrically connected to the generator 116 (e.g. at a fixed speed ratio) without any intervening power electronics, such as inverters, rectifiers, or other high power AC/DC/AC converters therebetween. For example, the at least one electrically powered air-mover 118 may be an induction motor and/or can include line start permanent magnets.

Figure 3:
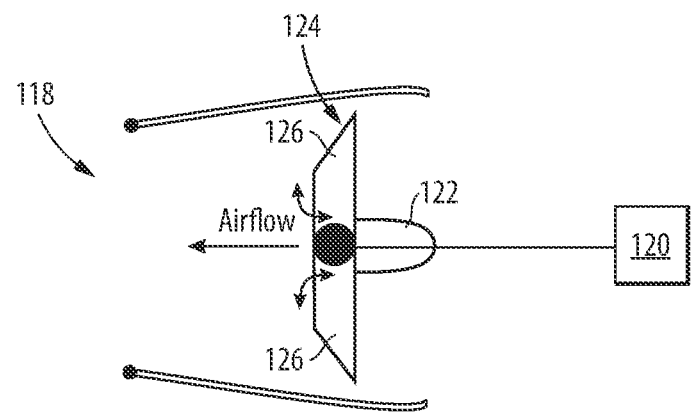
FIG. 3 is a schematic diagram of an air mover, showing a means for controlling flow out of the air mover.
Figure 4:
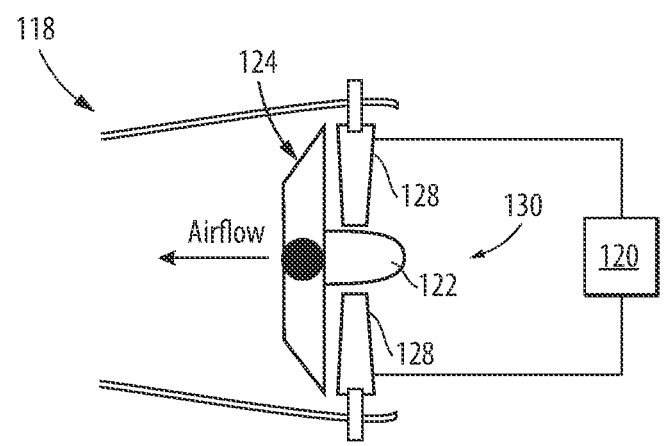
FIG. 4 is a schematic diagram of another air mover, showing a means for controlling flow into the air mover.
Figure 5:
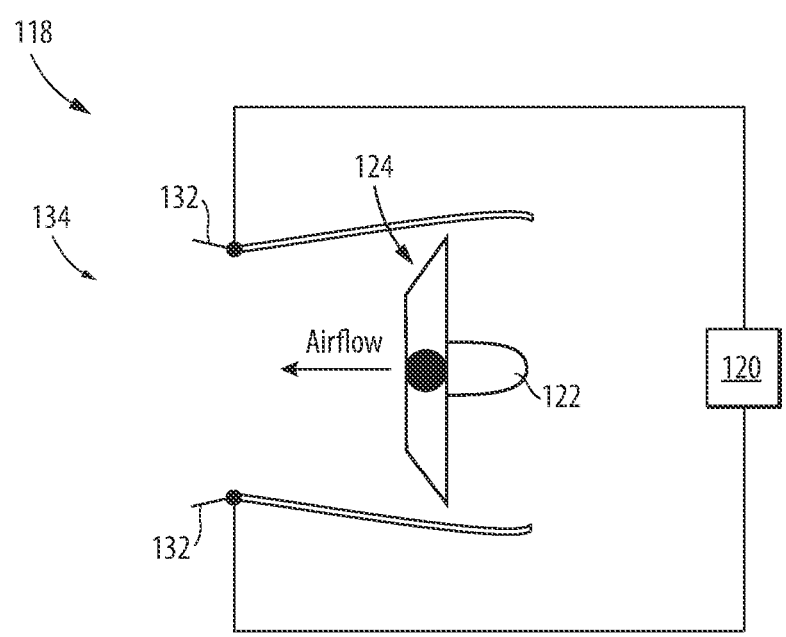
FIG. 5 is a schematic diagram of an air mover, showing another means for controlling flow out of the air mover.

Shown in FIGS. 3-5, the least one electrically powered air-mover 118 can include a motor 122 and a thrust producing rotor 124 operatively connected to a main control unit 120, connected to control portions of the least one electrically powered air-mover 118, for example one or more thrust control features. The thrust control features can include, but are not limited to, variable pitch blades, variable inlet guide vanes, variable nozzles, and/or a switching network. The thrust control features can adjust the flow into and/or out of the at least one electrically powered air-mover 118 to control loading of the turbocharger 104 (e.g. without bleeding off exhaust gas energy) and/or to control thrust from the at least one electrically powered air-mover 118.

As shown in FIG. 3, the thrust producing rotor 124 having variable pitch blades 126 controlled by the main control unit 120 to adjust the airflow provided by the at least one electrically powered air mover 118.

As shown in FIG. 4, variable inlet guide vanes 128 can be included on an inlet side 130 of the at least one electrically powered air-mover 118, upstream of the thrust producing rotor 124 and controlled by the main control unit 120, to adjust the aerodynamic load of the least one electrically powered air-mover 118 to regulate the speed of the turbocharger 104 and/or boost to the target value needed for each given power request.

As shown in FIG. 5, a variable air nozzle 132 can be included on an outlet side 134 of the at least one electrically powered air-mover 118, downstream of the thrust producing rotor 124 and controlled by the main control unit 120 to control the pressure ratio of the at least one electrically powered air-mover 118. It is also contemplated that the variable air nozzle 132 can be a passive system configured to control the pressure ratio of the at least one electrically powered air-mover 118 proportionally based on ambient pressure. In either case, the pressure ratio of the at least one electrically powered air-mover 118 can thus be adjusted to regulate the speed of the turbocharger 104 and/or boost to the target value needed for the power request.

Figure 6:
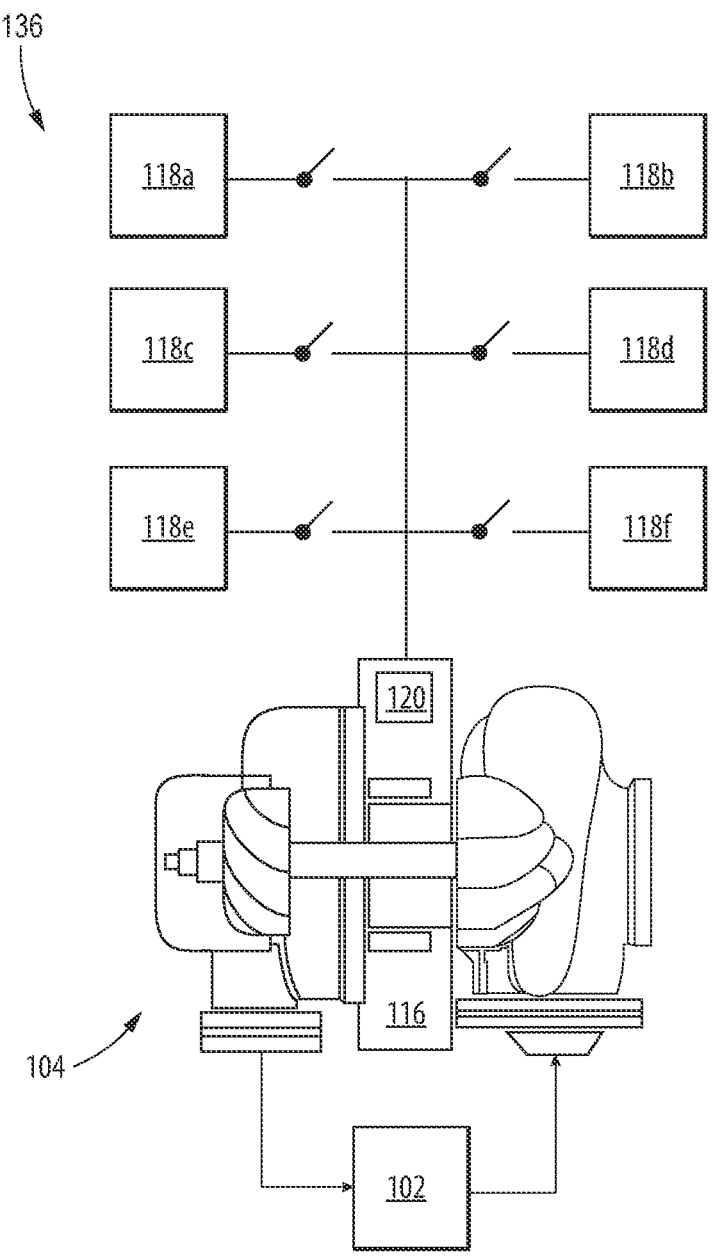
FIG. 6 is a schematic diagram of the aircraft power system of FIG. 1 showing another configuration of components in the aircraft power system.

Shown in FIG. 6, the at least one electrically powered air-mover 118 can be a plurality of electrically powered air-movers 118a-f electrically connected to the generator 116 through a switching network 136. The switching network 136 can be connected to the main control unit 120 to selectively power various air-movers 118, for example to selectively power various air-movers 116 on or off, or to selectively modulate the power provided to each of the air-movers 118a-f. By selectively powering and/or modulating the distribution of power to air-movers 118, the speed of the turbocharger 104 and/or boost can be regulated in discrete steps rather than linearly. Additional power adjustment can be adjusted using the speed of the internal combustion engine 102. Granularity can be adjusted for best trade-off between boost adjustability and number of electrically powered air movers 116. More specifically, a low number of air movers 118 is simpler but may only provide gross control, while conversely, a large number of air movers 118 allows for the possibility of fine control, but with added complexity and cost. Thus, while in FIG. 2, two electrically powered air movers 116 are shown, and in FIG. 5, six electrically powered air movers 116 are shown, any suitable number of air movers 116 can be used as needed to achieve desired control and/or complexity for a given application.

It should be understood that while each of thrust control features are shown and described as distinct embodiments, those skilled in the art would readily appreciate that the thrust control features can all be included in the same system 100 and that yet other embodiments are possible that may combine some or all of the features of the embodiments described herein. For example, the system 100 can include at least one electrically powered air-mover 118 having any one or all of variable pitch blades 126, variable inlet guide vanes 128, and/or a variable air nozzle 132, each of which may be operatively connected to the controller 120. Further, the plurality of electrically powered air-movers 118a-f electrically connected to the generator 116 through the switching network 134 can employ any suitable combination of variable pitch blades 126, variable inlet guide vanes 128, and/or a variable air nozzle 132, to suit each particular type, size and intended missions of the aircraft 1.

A method according to the present technology can include supplying air to the internal combustion engine 102 with the turbocharger 104 and extracting electrical power from the turbocharger 104. The extracted electrical power can then be used to drive at least one electrically powered air-mover 118 to generate thrust. Using the extracted electrical power can include supplying the extracted electrical power directly to the at least one electrically powered air-mover 118 without converting the power. Including the turbocharger 104 on the internal combustion engine 102, and extracting power from the turbocharger 104 to the at least one electrically powered air-mover 118 can reduce an infrared signature of the aircraft 1 and provide additional means for cooling to the system 100, as seen in FIG. 2. For example, the internal combustion engine 102 draws in ambient air 113 through the compressor, and forces exhaust through the turbine 110 to exit the turbocharger 104 as exhaust flow 114 with energy removed from the exhaust. At least a portion of that spent energy is used by the electrical generator 116 to power the at least one electrically powered air mover 118. The exhaust flow 114 has a reduced temperature (relative to its temperature without a turbocharger), reducing the overall infrared signature of the system 100.

The methods and systems of the present disclosure, as described above and shown in the drawings, may provide for increased fuel economy in internal combustion engines in at least some operating conditions and applications. In some cases, the economy may be provided by harvesting waste energy and using it for vehicle propulsion. Further, removing additional energy from the combustion engine and the turbocharger can cool the exhaust, thereby reducing the infrared signature of the system 100. In some embodiments and applications, this may lessen a chance of thermal detection of the system 100 and/or aircraft 1. While the apparatus and methods of the subject disclosure have been shown and described, those skilled in the art will readily appreciate that changes and/or modifications may be made thereto without departing from the scope of the subject disclosure. For example, while in some embodiments the turbo shaft 112 may be a single shaft, in other embodiments it may include multiple parts, such as one or more operatively interconnected shafts.

What is claimed is:

1. An aircraft power system of an aircraft, the aircraft power system comprising:
   an internal combustion engine;
   a main air mover configured to provide thrust to the aircraft, the main air mover operatively connected to the internal combustion engine;
   a turbocharger including:
     a compressor for supplying combustion air to the internal combustion engine, a turbine operatively connected to the internal combustion engine to receive an exhaust flow from the internal combustion engine and convert energy of the exhaust flow into rotational power, and a turbo shaft operatively connecting the turbine to the compressor to transfer at least some of the rotational power to the compressor;
   a generator mechanically connected to the turbo shaft to receive at least some of the rotational power from the turbo shaft for generating electrical power; and
   at least one electrically powered air-mover electrically connected to the generator to receive at least some of the electrical power and to provide thrust to the aircraft in cooperation with the main air mover, the at least one electrically powered air-mover and the generator being electrically connected together, a pressure ratio of the at least one electrically powered air-mover being adjustable using a variable air nozzle of the at least one electrically powered air-mover.

2. The system as recited in claim 1, wherein the at least one electrically powered air-mover includes a thrust-producing rotor.

3. The system as recited in claim 2, further comprising variable inlet guide vanes disposed upstream of the thrust-producing rotor of the at least one electrically powered air-mover, the variable inlet guide vanes being operable to adjust airflow to the thrust-producing rotor.

4. The system as recited in claim 2, wherein the variable air nozzle is downstream of the thrust-producing rotor of the at least one electrically powered air-mover, the variable air nozzle being operable to adjust airflow out of the thrust-producing rotor.

5. The system as recited in claim 2, wherein the at least one electrically powered air-mover includes a plurality of electrically powered air-movers electrically connected to the generator through a switching network configured to selectively power various air-movers of the plurality of electrically powered air-movers.

6. The system as recited in claim 2, wherein the thrust-producing rotor includes variable pitch blades.

7. The system as recited in claim 1, wherein the main air mover and the at least one electrically powered air-mover are mounted to an airframe of the aircraft.

8. A method comprising:
   supplying combustion air to an internal combustion engine of an aircraft with a turbocharger;
   providing thrust to the aircraft using a main air mover powered by the internal combustion engine;
   extracting electrical power from the turbocharger with a generator mechanically coupled to a turbo shaft of the turbocharger; and
   using the extracted electrical power to drive at least one electrically powered air-mover of the aircraft to generate thrust in cooperation with the main air mover by supplying the extracted electrical power to the at least one electrically powered air-mover without converting the power, and further comprising adjusting a pressure ratio of the at least one electrically powered air-mover using a variable air nozzle of the at least one electrically powered air-mover.

9. The method as recited in claim 8, further comprising controlling one or both of loading of the turbocharger and thrust from the at least one electrically powered air-mover by adjusting airflow into the at least one electrically powered air-mover.

10. The method as recited in claim 8, further comprising controlling one or both of loading of the turbocharger and thrust from the at least one electrically powered air-mover by adjusting airflow out of the at least one electrically powered air-mover.

11. The method as recited in claim 8, wherein the at least one electrically powered air-mover is a plurality of electrically powered air-movers, and further comprising selectively powering various air-movers of the plurality of electrically powered air-movers to control one or both of loading of the turbocharger and an overall thrust generated by the plurality of electrically powered air-movers.

12. An aircraft power system comprising:
an internal combustion engine;
a main air mover configured to provide thrust to an aircraft, the main air mover operatively connected to the internal combustion engine;
a turbocharger operatively connected to the internal combustion engine, the turbocharger including:
a compressor for supplying combustion air to the internal combustion engine,
a turbine operatively connected to the internal combustion engine to receive an exhaust flow from the internal combustion engine and convert energy of the exhaust flow into rotational power, and
a turbo shaft operatively connecting the turbine to the compressor to transfer at least some of the rotational power to the compressor;
a generator mechanically connected to the turbo shaft to receive at least some of the rotational power from the turbo shaft for generating electrical power; and
at least one electrically powered air-mover having a thrust producing rotor electrically connected to the generator to receive at least some of the electrical power to produce thrust, the at least one electrically powered air-mover and the generator being electrically connected together, a pressure ratio of the at least one electrically powered air-mover being adjustable using a variable air nozzle of the at least one electrically powered air-mover.

13. The aircraft power system of claim 12, further comprising:
a controller operatively connected to the generator and the at least one electrically powered air-mover, wherein controller is configured to:
control the generator to directly and selectively power the at least one electrically powered air-mover; and
control one or more thrust control features of the at least one electrically powered air-movers.

14. The aircraft power system of claim 13, wherein the one or more thrust control features of the electrically powered air-mover includes at least one of variable pitch blades, variable inlet guide vanes disposed upstream of the thrust-producing rotor, the variable air nozzle downstream of the thrust-producing rotor, and/or switching network operatively connected to the controller.

15. The system as recited in claim 1, wherein the generator is disposed at least in part between the turbine and the compressor.

16. The system as recited in claim 1, wherein the generator is coaxial with the turbo shaft, the compressor, and the turbine.

17. The system as recited in claim 1, wherein the generator is adjacent the compressor and the turbine.

18. The method as recited in claim 8, further comprising adjusting an airflow provided by the at least one electrically powered air-mover using variable pitch blades of the at least one electrically powered air-mover.

19. The method as recited in claim 8, further comprising adjusting an aerodynamic load of the at least one electrically powered air-mover using a variable inlet guide vane of the at least one electrically powered air-mover.

* * * * *